United States Patent [19]

Reda

[11] Patent Number: 5,438,879
[45] Date of Patent: Aug. 8, 1995

[54] METHOD FOR MEASURING SURFACE SHEAR STRESS MAGNITUDE AND DIRECTION USING LIQUID CRYSTAL COATINGS

[75] Inventor: Daniel C. Reda, San Jose, Calif.

[73] Assignee: The United States of America as represented by the Administrator of the national Aeronautics and Space Administration, Washington, D.C.

[21] Appl. No.: 330,144

[22] Filed: Oct. 20, 1994

Related U.S. Application Data

[63] Continuation-in-part of Ser. No. 31,972, Mar. 16, 1993, Pat. No. 5,394,752.

[51] Int. Cl.⁶ ............ G01M 9/00; G01N 21/23; G01N 27/61; G02F 1/13
[52] U.S. Cl. .................................................. 73/800
[58] Field of Search ...................... 73/147, 762, 800

[56] References Cited

U.S. PATENT DOCUMENTS

| | | | |
|---|---|---|---|
| 4,142,404 | 3/1979 | Ogata et al. | 73/762 |
| 4,255,049 | 3/1981 | Sahm et al. | 73/762 |
| 4,655,589 | 4/1987 | Cestaro et al. | 356/35 |
| 4,668,916 | 5/1987 | Pech | 324/456 |
| 4,774,835 | 10/1988 | Holmes et al. | 73/147 |
| 5,070,729 | 12/1991 | Jensen | 73/147 |
| 5,223,310 | 6/1993 | Singh et al. | 428/1 |

OTHER PUBLICATIONS

Klein, E. J., "Liquid Crystals in Aerodynamic Testing" Astronautics and Aeronautics, vol. 6, Jul. 1968, pp. 70–73.
"A New Method for Laminar Boundary Layer Transition Visualization in Flight-Color Changes in Liquid Crystal Coatings", NASA Technical Memorandum, 87666, Jan. 1986.

*Primary Examiner*—Richard E. Chilcot, Jr.
*Assistant Examiner*—George M. Dombroske
*Attorney, Agent, or Firm*—Kenneth L. Warsh; Guy M. Miller; John G. Mannix

[57] ABSTRACT

A method is provided for determining surface shear magnitude and direction at every point on a surface. The surface is covered with a shear stress-sensitive liquid crystal coating and illuminated by white light from a normal direction. A video camera is positioned at an oblique angle above the surface to observe the color of the liquid crystal at that angle. The shear magnitude and direction are derived from the color information. A method of calibrating the device is also provided.

9 Claims, 5 Drawing Sheets

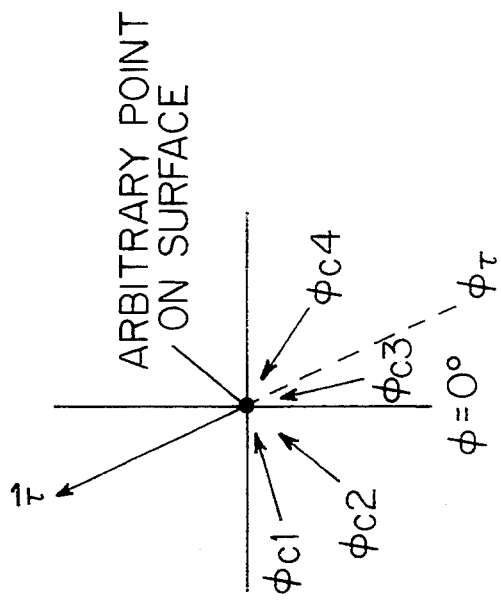
FIG. 8(a)
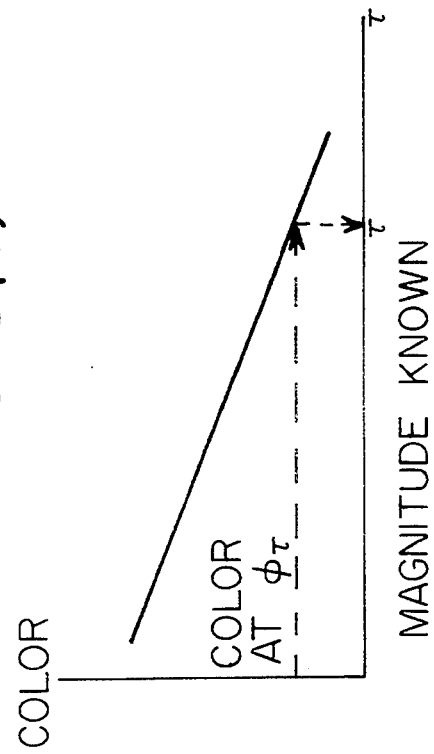
FIG. 8(b)
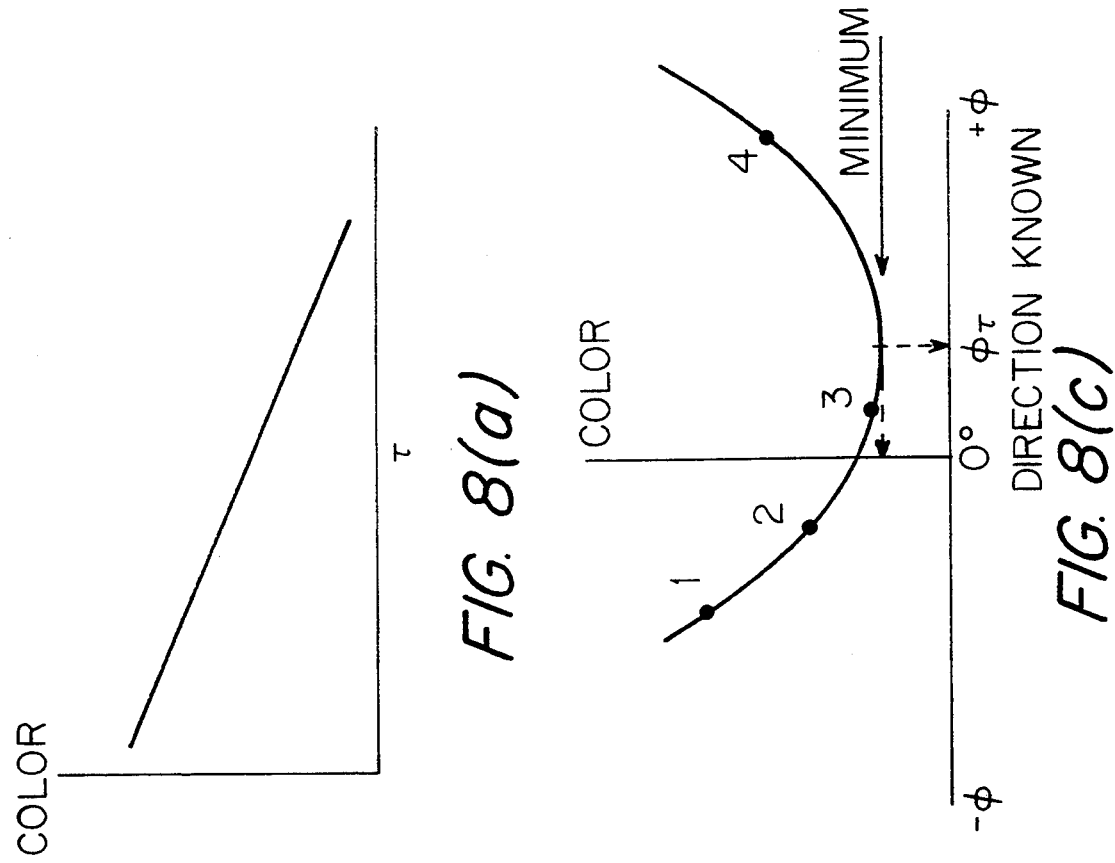
FIG. 8(c)
FIG. 8(d)

METHOD FOR MEASURING SURFACE SHEAR STRESS MAGNITUDE AND DIRECTION USING LIQUID CRYSTAL COATINGS

ORIGIN OF THE INVENTION

The invention described herein was made by an employee of the United States Government and may be manufactured and used by or for the Government for governmental purposes without the payment of any royalties thereon or therefor.

CROSS-REFERENCE TO RELATED APPLICATIONS

This is a Continuation-in-Part of application Ser. No. 08/031,972, filed Mar. 16, 1993, now U.S. Pat. No. 5,394,752.

FIELD OF THE INVENTION

The present invention is directed to aerodynamic testing using liquid crystals, and, more particularly, is a method for obtaining full-field measurements of both the magnitude and direction of surface shear stress in such testing.

BACKGROUND OF THE INVENTION

In fluid mechanics and aerodynamics research, much valuable information can be gained from visualizations of both the outer flow and surface shear stress patterns over solid bodies immersed in fluid streams. The liquid crystal coating method, i.e., a method wherein a liquid crystal coating is applied to a surface under test, is a diagnostic technique that can provide areal visualizations of instantaneous shear stress distributions on surfaces in dynamic flow fields with a response that is rapid, continuous and reversible. Reference is made, for example, to Klein, E. J., "Liquid Crystals in Aerodynamic Testing," Astronautics and Aeronautics, Vol. 6, July 1968, pp. 70–73.

Liquid crystals are highly anisotropic "fluids" that exist between the solid and isotropic liquid phases of some organic compounds. As such, these crystals exhibit optical properties characteristic of a crystalline (solid) state, while displaying mechanical properties characteristic of a liquid state. Typically, in flow-visualization applications, a mixture of one part liquid crystals to nine parts solvent (presently, Freon) is sprayed on the aerodynamic surface under study. A smooth, flat-black surface is essential for color contrast and must be kept free of grease and other chemical contaminants. Recommended applications (after spray losses) are about 10 to 20 ml liquid crystals, measured prior to mixing with the solvent, to each square meter of surface area. The solvent evaporates, leaving a uniform thin film of liquid crystals whose thickness, based on mass conservation and estimated spray losses, is approximately 10 to 20$\mu$ (0.0004 to 0.0008 inch). Once aligned by shear, the molecules within the liquid crystal coating selectively scatter incident white light as a spectrum of discrete colors, with each color at a discrete angle (orientation) relative to the surface. For "thermochromic" liquid crystal compounds, this molecular structure, and thus the light scattering capability of the coating, responds to both temperature and shear stress. For newly-formulated, shear-stress-sensitive/temperature-insensitive compounds, such as Hallcrest BCN/192 and CN/R3, "color play" (i.e., discerned color changes at a fixed angle of observation, for a fixed angle of illumination) results solely from the application of shear stress.

While it is now known that this technique can be calibrated (under carefully controlled conditions) to measure surface shear stress magnitudes, two important issues remain: time response and "directional sensitivities," i.e., sensitivity to illumination and viewing angles, as well as to the instantaneous shear stress direction.

The time-response issue has been investigated (see Parmar, D. S., "A Novel Technique for Response Function Determination of Shear Sensitive Cholesteric Liquid Crystals for Boundary Layer Investigations," Review of Scientific Instruments, Vol. 62, No. 6, June 1991, pp. 1596–1608) by placing a liquid crystal layer (about 100 $\mu$ thick) between two optical glass plates and applying known and transient shear forces via a displacement of one plate. Liquid crystal delay, rise and relaxation time constants were measured as a function of the monochromatic wavelength of the incident light. Time constants in the range of 10 to 100 milliseconds were generally observed, with minimum values being on the order of 3 milliseconds. The extrapolation (or applicability) of these results to actual fluid mechanic applications, wherein liquid crystal coating thicknesses are an order of magnitude less, remains an open question.

Another approach to characterizing the time-response and/or flow-direction-indication capabilities of the liquid crystal technique is to expose the coating to transient viscous flows of known time scales and/or known shear directions. Oscillating airfoil experiments provided some initial results concerning both issues (see Reda, D. C., "Liquid Crystals for Unsteady Surface Shear Stress Visualization," AIAA Paper 88-3841, July 1988 and Reda, D. C., "Observations of Dynamic Stall Phenomena Using Liquid Crystal Coatings," AIAA Journal, Vol 29, No. 2, February 1991, pp. 308–310).

In general, while previous investigators have utilized the liquid crystal technique, the focus of such research has been on attempting to determine parameters related to the magnitude of shear stress, for example the sudden increase in shear stress levels at the transition from laminar to turbulent flow. Reference is made, for example, to U.S. Pat. No. 4,774,835 (Holmes) and to Holmes et al, "A New Method for Laminar Boundary Layer Transition Visualization in Flight: Color Changes in Liquid Crystal Coatings," NASA Technical Memorandum, 7666, January 1986.

Currently, numerous point measurement techniques are available to determine surface shear stress magnitude. These techniques only allow discrete point measurements of surface shear stress magnitude. Several of these methods can also be used to measure local shear stress direction. However, no full-surface vector measurement capability presently exists.

SUMMARY OF THE INVENTION

It is an object of the present invention to use the liquid crystal coating (LCC) method as a quantitative technique for measuring surface shear stress vector fields in three-dimensional flows.

The present invention is based on the discovery or inventive appreciation that when the liquid crystal coating is subjected to shear (e.g., by a wind tunnel flow over the surface of the liquid crystals), the resulting color-play response is dependent on both the magnitude and the direction of the shear. By directing a beam of white light onto an LCC surface to cause the white light to be dispersed from the surface, generating a calibration curve of color versus absolute shear magnitude, rotating an observer from a setting used for the calibration step, and obtaining a plurality of images by the observer along a circumferential arc, the shear direction may be determined from the plurality of images and, from the color corresponding to the shear direction, the shear magnitude may be determined from the calibration curve.

Advantageously, in generating the calibration curve, the maximum shear level is applied to the surface, the observer is rotated about the surface until a maximum color change signal is located, an above plane view angle is adjusted until a further maximum color change signal is located. The calibration step then includes generating a calibration curve for a plurality of parametric values of shear magnitude.

Advantageously, the shear direction may be determined by plotting color versus circumferential view angle, curve fitting a symmetric function along the plot, and determining, from the minimum of said symmetric function, the shear direction and corresponding color.

Other features and advantages of the invention will be se forth in, or apparent from, the following detailed description.

BRIEF DESCRIPTION OF THE DRAWINGS

FIGS. 8a–8d outline the four steps necessary to measure surface shear stress vector fields using the liquid crystal coating technique.

DETAILED DESCRIPTION OF THE PREFERRED EMBODIMENTS

Figure 1:
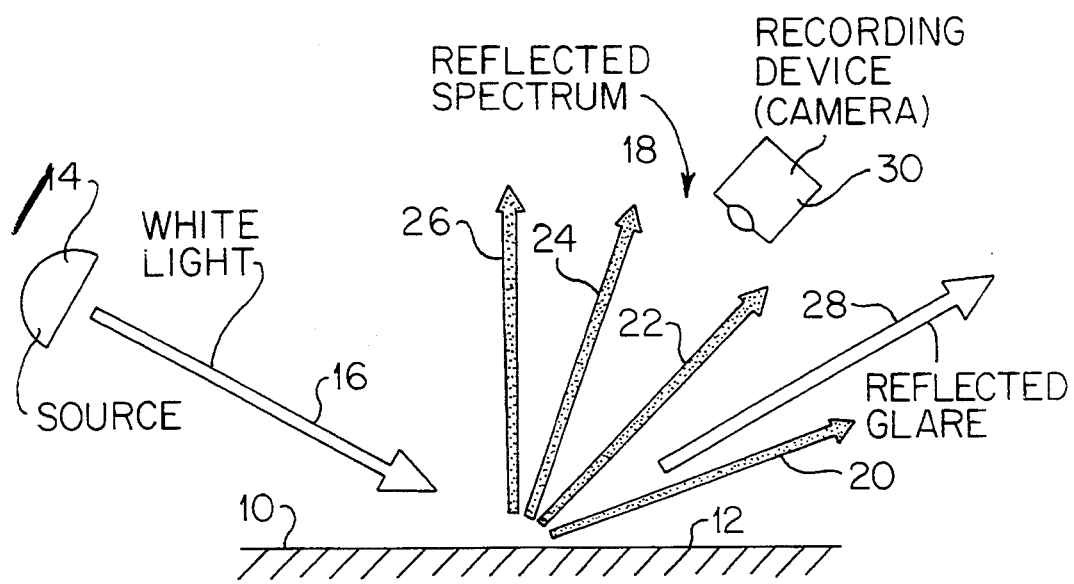
FIG. 1 is a schematic representation of the dispersed (reflected) light spectrum produced by directing a beam of white light obliquely onto a surface coated with an aligned liquid crystal layer.

Referring to FIG. 1, a schematic representation is provided of the "color play" provided by a liquid crystal coating. In FIG. 1, an aligned liquid crystal coating 10 is provided on a black surface 12 beneath coating 10, and a source 14 produces a beam of white light indicated at 16. The reflected spectrum 18 from coating 10 comprises, as discussed above, a series of discrete colors or color bands. More specifically, in the schematic representation provided in FIG. 1, these bands comprise a blue (turquoise) band 20, a green band 22, a yellow band 24 and a red band 26, and these bands are produced in addition to a reflected glare line indicated 28. An observer, in the form of a recording device 30 comprising a movie and/or video camera, is positioned near "mid-spectrum," i.e. just before the yellow-to-green transition angle so that the observer sees the yellow color. In this simplest of all possible arrangements, the light, camera and flow direction are all in the same plane. The technical paper "Time and Flow-Direction Responses of Shear-Stress-Sensitive Liquid Crystal Coatings," D. C. Reda, J. J. Muratore, Jr., and J. T. Heineck, AIAA Journal, v. 32, April 1994, pp. 693–700, which is hereby incorporated by reference, describes calibration procedures for more complex experimental arrangements.

Figure 2A:
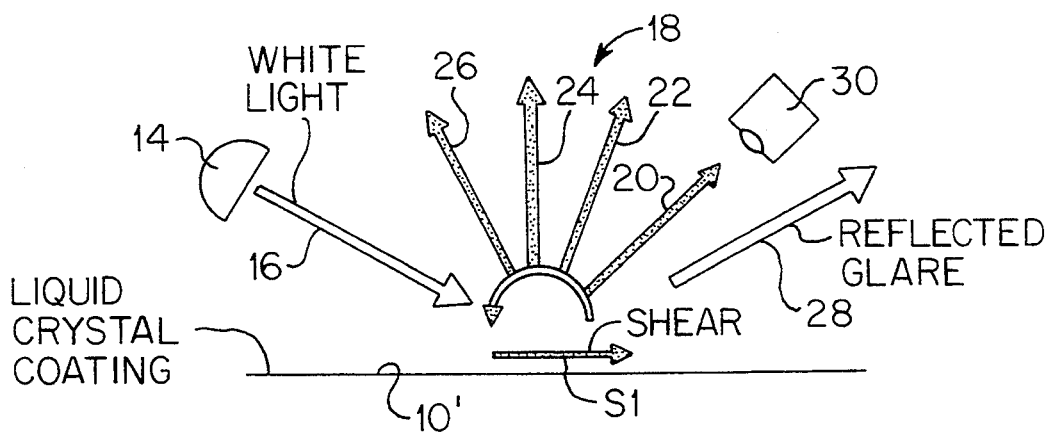
FIG. 2(a) and 2(b) are views corresponding to that of FIG. 1 showing the rotation of the reflected light spectrum in response to shear stresses imparted to the liquid crystal coating in respective opposite directions.
Figure 2B:
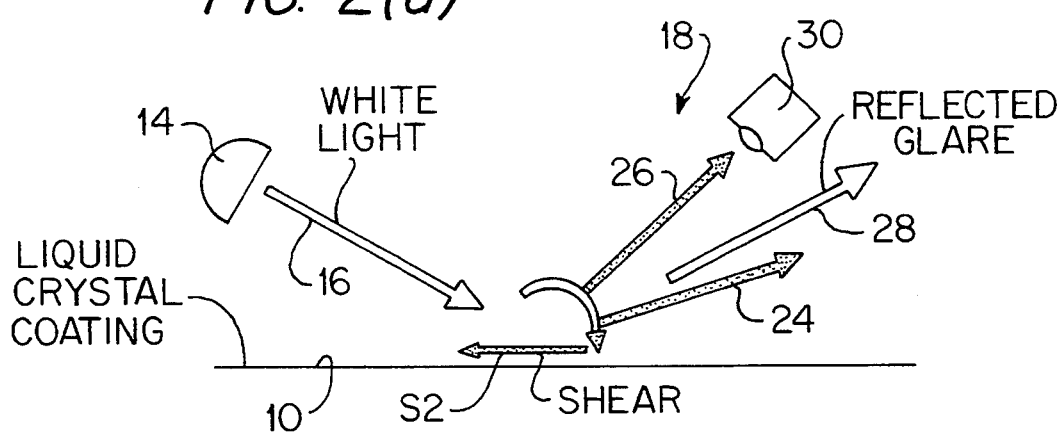

Referring to FIGS. 2(a) and 2(b), there are shown schematic representations similar to that of FIG. 1, illustrating the spectrum rotations produced by the application of shear stresses. In particular, FIG. 2(a) depicts a situation wherein shear, i.e., shear stress, indicated by arrow S1, is exerted from left to right and as illustrated, under these circumstances the reflected spectrum 18 rotates counterclockwise so that the blue band 20 is viewed or observed by camera 30 instead of the yellow band as in FIG. 1. In contrast, 2(b) illustrates a situation wherein shear, indicated by arrow S2, is exerted from right to left and illustrates the fact that the spectrum 18 rotates clockwise and the red band 26 is viewed by recording device 30. Thus, it will be appreciated from the foregoing that by determining the color band observed by the observer (recording device) 30, a determination can be made of the direction of the shear applied to the liquid crystal coating 10.

As demonstrated above, liquid crystal coating (LCC) color change response to shear depends on the shear stress direction. It is further known that LCC color play response depends on the shear stress magnitude. Based on this knowledge that the color-play response depends on both the shear stress magnitude and direction, the arrangement shown in FIGS. 3 and 4 allows the LCC method to be converted from a flow visualization tool to a quantitative measurement technique for surface shear stress vectors. The technical paper "Measurement of Surface Shear Stress Vectors Using Liquid Crystal Coatings," D. C. Reda and J. J. Muratore, Jr. AIAA , Journal, v. 32, August 1994, pp. 1576–1582, which is hereby incorporated by reference, describes the measurement methodology.

Figure 3:
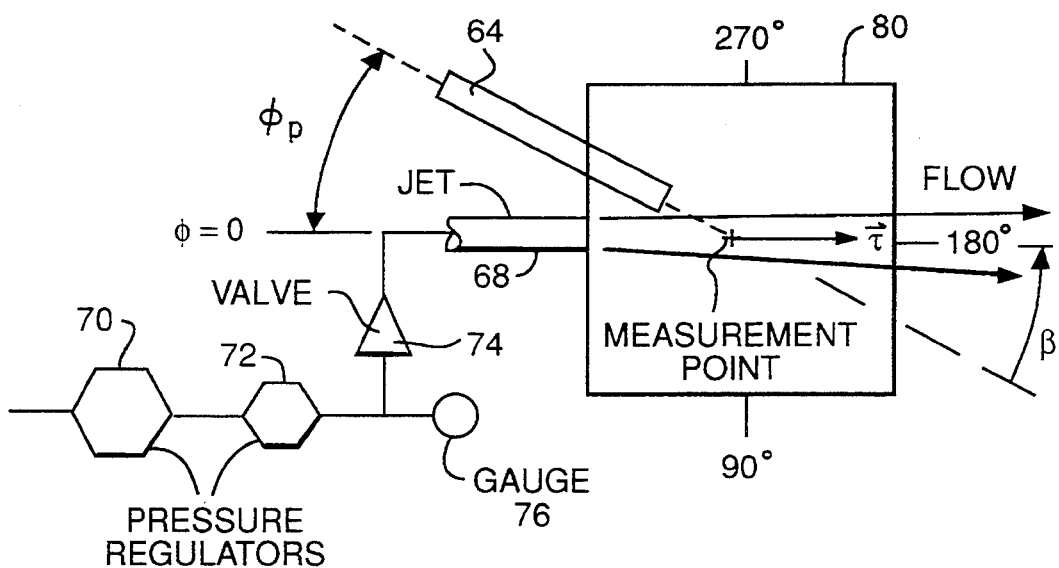
FIG. 3 is a top plan view of a measuring arrangement of the present invention.
Figure 4:
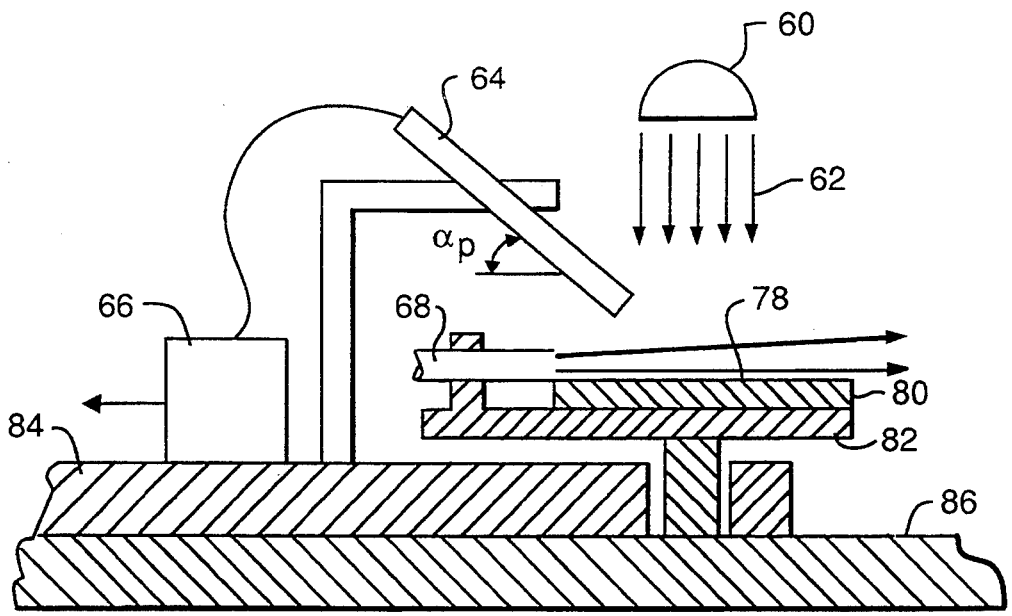
FIG. 4 is a side elevational view, partially in cross section, of the measuring arrangement shown in FIG. 3.

In contrast to the arrangement shown in FIGS. 1–2(b) in which oblique illumination is used, FIGS. 3 and 4 illustrate the use of normal illumination. Under normal illumination, any point exposed to a shear vector with a component directed away from the observer exhibits a color play response, i.e. a shift from the no shear color (orange) towards the blue end of the visible spectrum. Conversely, any point exposed to a shear vector with a component directed toward the observer exhibits a non-color play response (always characterized by a rusty brown appearance). Further, this two-lobe color response rotates with the observer, i.e., it is identical for all circumferential view angles.

For the arrangement in FIGS. 3 and 4, a liquid crystal mixture having a viscosity and full-spectrum color-play response consistent with the absolute shear levels to be encountered must be selected and a coating 78 applied, here to a plate 80. Plate 80 is supported by a support stand 82, which in turn is mounted on the optics table 86. The surface of plate 80, assumed planar for the sake of this explanation, is then illuminated with white light 62 from white light source 60 in the normal direction and the maximum shear level is applied to the surface.

A pair of pressure regulators 70, 72, connected in series, control the pressure difference used to drive the flow through the circular jet 68. The value of this pressure difference is indicated by a calibrated gauge 76. A valve 74 is used to supply the pressure difference.

In order to calibrate the liquid crystal color play response to shear, surface shear vectors of known direction (relative to the observer) and known relative magnitude are imposed upon coated surface 80 via jet 68. In such flows, the skin friction coefficient, $C_f = \tau/0.5\rho V_j^2$, is essentially constant in the near exit region over a wide range of Reynolds numbers. Thus, for a constant density ($\rho$), the magnitude of the surface shear stress vector ($\tau$) on the jet centerline scales linearly with the square of the jet exit velocity ($V_j^2$) which in turn scales linearly with the pressure difference used to drive the flow. Relative changes in jet pressure, measured by gauge 76, define the relative changes in shear magnitude ($\tau/\tau_r$), where the subscript r denotes some arbitrary "lowest shear" reference level.

An observer, here a fiber optic probe 64, is positioned above the test surface at a nominal above-plane (oblique) view angle (indicated at $\alpha_p$), e.g., $\alpha_p = 30°$, facing downstream relative to the nominal freestream velocity vector. The measurement point of the fiber optic probe 64 is on the centerline of the wall jet flow and this point is always coincident with the center of rotation of the probe-traversing platform, thereby allowing the relative view angle between the shear vector and the observer ($\beta$) to be systematically varied. Light captured by probe 64 is input to a spectrophotometer 66 which disperses the received light into its spectral content. Measurements of irradiance from the coating 78, as a function of the wavelength of light, are thus obtained over the entire visible spectrum.

Figure 5:
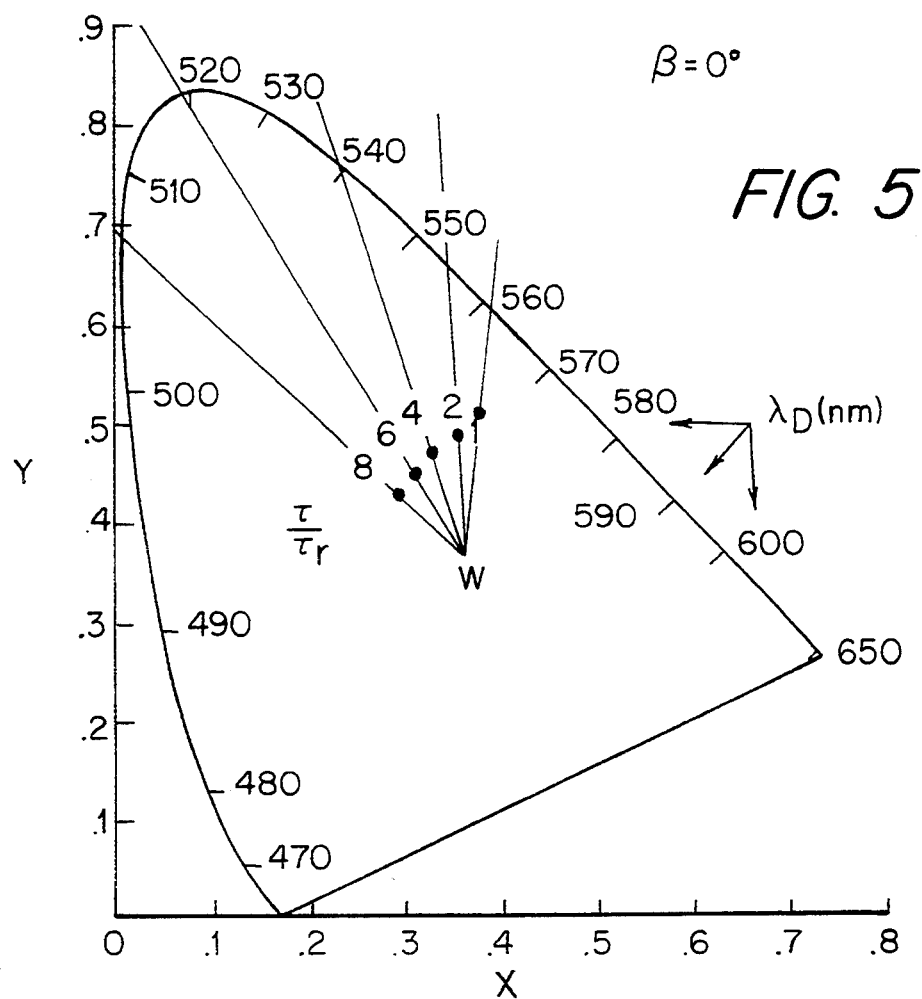
FIG. 5 is a CIE chromaticity diagram for numerous shear magnitudes at $\beta = 0°$.

As shear magnitude is increased, the peak intensity of the scattered light decreases and, more importantly, the wavelength corresponding to this peak intensity shifts to lower wavelengths (indicating a shift in color from orange, through yellow and green to blue). Using established methods, such irradiance measurements are converted into standard chromaticity coordinates (x,y) which quantify the color of the coating at each test condition. Graphical determination of dominant wavelengths $\lambda_D$ is shown in FIG. 5, which is a CIE chromaticity diagram. FIG. 5 clearly shows the relationship between the color of the liquid crystal coating and the relative magnitude of shear stress applied at $\beta = 0°$. Dominant wavelengths ($\lambda_D$), obtained by extrapolation from white light (W) through the measured chromaticity coordinates (the solid dots in FIG. 5) to the extremes of the chromaticity diagram, have been found to be entirely consistent with the observed peak-power wavelengths and the visually observed colors. A single calibration curve of color (dominant wavelength $\lambda_D$ or hue) versus relative shear stress magnitude can then be obtained, as shown in FIG. 6; conventional point-measurement techniques should be used to measure absolute shear magnitude $\tau$ in actual experiments.

Figure 6:
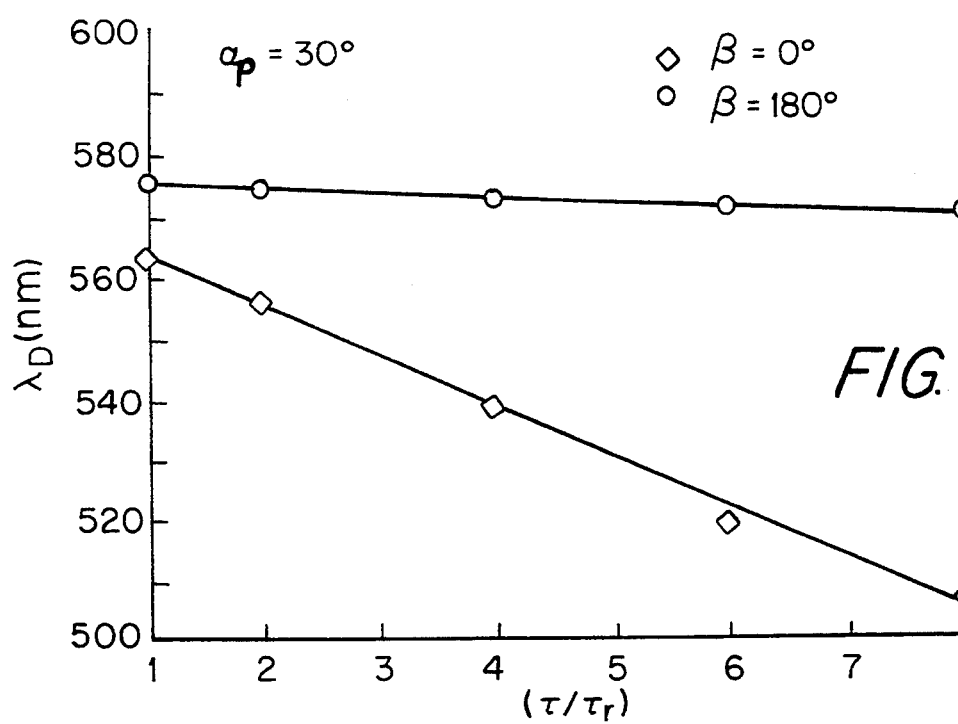
FIG. 6 is a plot of dominant wavelength versus relative surface shear stress magnitude for limiting circumferential view angles of $\beta = 0°$ and $180°$.

FIG. 6 shows a plot of measured minimum dominant wavelength ($\lambda_{Dmin}$) versus relative shear stress magnitude for the situation where the observer and the vector are perfectly aligned and flow is away from the observer (at $\beta = 0°$). Under this condition, color change is seen to scale linearly with increasing shear stress magnitude for $1 \leq \tau/\tau_r \leq 8$. At higher shear rates, the color-play response becomes nonlinear.

For non-planar test surfaces, a family of such color versus shear magnitude calibration curves would have to be generated to parametrically cover those effective (above-tangent-plane) view angles encountered.

Figure 7:
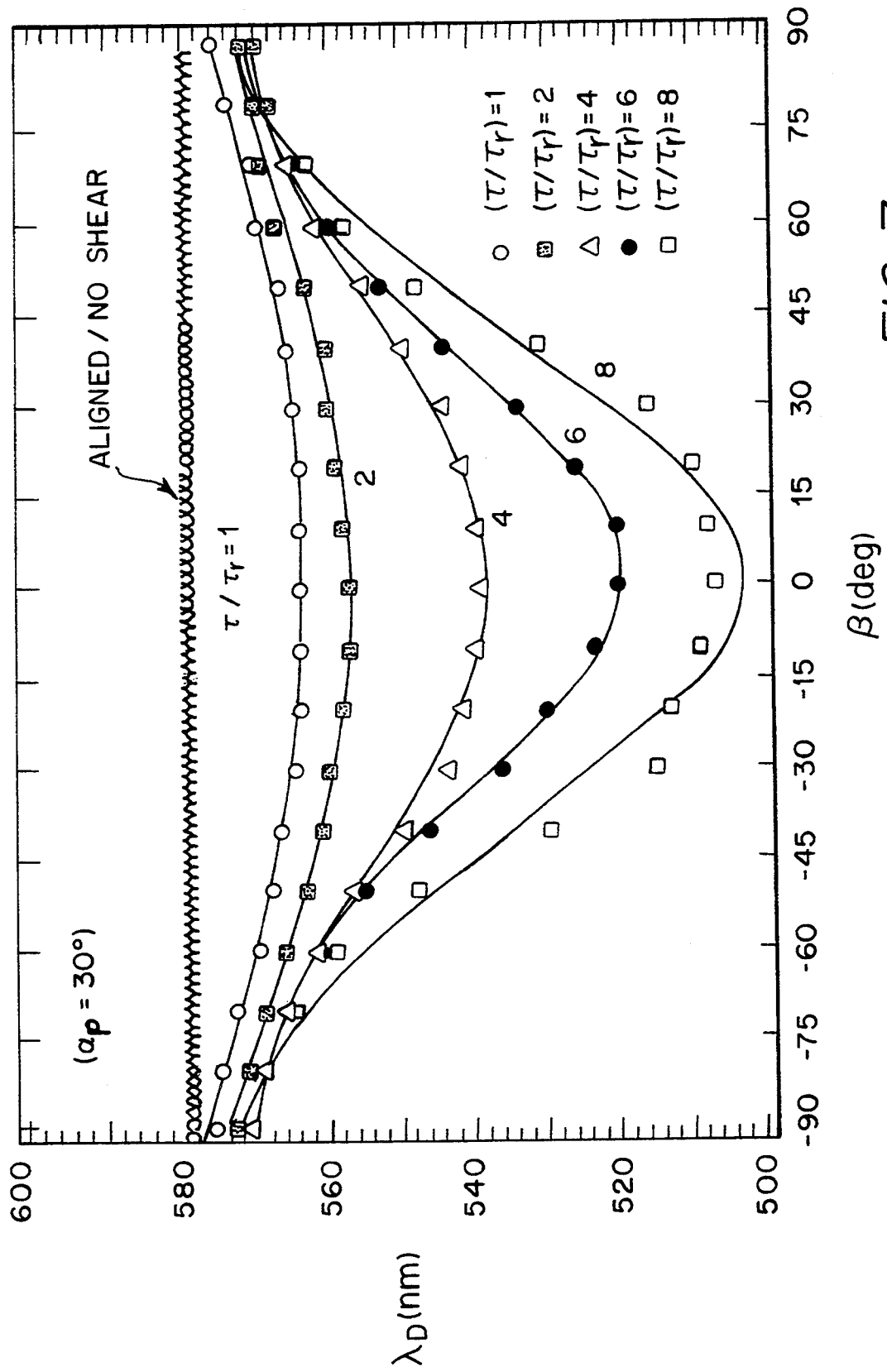
FIG. 7 is a plot of dominant wavelength versus relative circumferential view angle between observer and shear vector, with relative surface shear stress magnitude as the parameter.

FIG. 7 shows plots of dominant wavelength ($\lambda_D$) versus the relative, circumferential-view angle between the shear vector and the observer ($\beta$, where positive angles are measured clockwise from the local line of sight). The probe angle, relative to the plane of the test surface ($\alpha_p$) is held constant. The parameter in this family of curves is the relative magnitude of the shear vector ($\tau/\tau_r$). The key for the plot is as follows: ○ ($\tau/\tau_r$) = 1; ■ ($\tau/\tau_r$) = 2; △ ($\tau/\tau_r$) = 4; ● ($\tau/\tau_r$) = 6; and □ ($\tau/\tau_r$) = 8. Two principal results are evident: (1) for a given shear stress magnitude, the minimum dominant wavelength (i.e., the maximum color change) is measured when the shear vector is aligned with, and directed away from, the observer (at $\beta = 0°$); (2) for a given shear stress magnitude, changes in relative circumferential-view angle $\beta$ to either side of the vector-/observer aligned position result in symmetric increases in measured dominant wavelength. While the solid lines in FIG. 7 indicate Gaussian curve fits, which fit the measured data sets well for $-90° \leq \beta \leq +90°$, it is noted that the data may also be fit by a simple second-order polynomial curve over the limited range $-60° \leq \beta \leq +60°$.

Influences of point-to-point variations for a single coating as well as coating-to-coating variations are not great. At relative shear magnitudes of 4, 6, and 8, measurements of dominant wavelength were repeated to within order 2 to 3 nm over the entire $\beta$ range shown in FIG. 7. Similar small variations in $\lambda_D$, of order 2 nm or less, were measured after six-minute exposures to the highest shear levels of ($\tau/\tau_r$) = 8.

A final element to be addressed concerns the approach by which the method of the present invention can be expanded from a point-measurement technique to a full-surface, or areal, technique. To achieve this capability, the fiber optic probe and spectrophotometer are replaced by a three-chip, co-site sampled, RGB digital color camera (denoted by subscript c) linked to a full-image frame grabber and a supporting computer. Calibration and data acquisition are accomplished in exactly the same manner as used in the point-measurement techniques. FIGS. 8a–8d schematically outline the four steps required to measure shear vector orientation ($\phi_\tau$) and magnitude ($\tau$) at every point on a test surface.

In the first step, the calibration curve for $\beta = 0°$, as shown in FIG. 8a, is generated for a given $\alpha_c$, for the calibration vector aligned with and directed away from the camera ($\phi_c = \phi_\tau$). In the second step, three or more full surface images are acquired, maintaining a constant $\alpha_c$, at known $\phi_c$ angles along a circumferential arc encompassing all possible vector directions encountered in the three-dimensional, steady state flow under investigation, as shown in FIG. 8b.

The three RGB voltages for every pixel in each full-surface image are converted into a color value consistent with the conversion used in FIG. 8(a) In the third step, color versus circumferential angle $\phi$ is plotted and a curve fit is obtained as shown in FIG. 8c, for each point on the surface. The correspondence between image-pixel locations and surface-point locations must be established for all view-angle combinations used to record the images. The curve fit must be a function that is symmetric about the minimum color value, e.g., Gaussian or parabolic. The angle at which the minimum color (or maximum color change) occurs defines the vector direction $\phi_\tau$.

In the fourth step, for each physical point on the surface, the curve-fit-defined minimum color value determined in the third step is input to the color versus shear magnitude calibration curve of the first step, as shown in FIG. 8d, in order to define the vector magnitude $\tau$.

The test methodology outlined above does not require calibration curves at any $\beta$ orientation other than the observer/vector aligned position (at $\beta = 0°$); it only requires the knowledge that the minimum dominant wavelength for any given shear stress magnitude occurs when the shear vector is aligned with, and directed away from, the observer. In other words, the family of curves represented by FIG. 7 is not required to apply the present measurement technique. Extension of this technique to unsteady (time-varying) flows would require fixed/synchronized cameras to be positioned at three or more circumferential-view angles encompassing the vector directions to be measured.

In summary, an LCC surface is illuminated with white light from the normal direction and a maximum shear level is applied to the surface. An observer is rotated about the surface until a maximum color change is located. At this orientation, the above plane view angle is adjusted in order to maximize the color change signal. A color versus absolute shear stress magnitude calibration curve is obtained. Then, while the above plane view angle is maintained, images at known circumferential view angles are obtained. These images are used to plot color versus circumferential view angle at each surface point and a curve fit is used to locate the minimum color value. The angle at which this minimum color value (or maximum color change) occurs is the vector orientation at each surface point. The calibration curve is then used to determine the magnitude of the shear vector corresponding to the minimum color value at each surface point.

Resolution of the measurement technique, to $\pm 1°$ in orientations and $\pm 5\%$ in magnitudes, is best achieved using five or more full-surface images and Gaussian curve fits.

Alternatively, it is mathematically possible to determine the two unknowns (magnitude and direction) from just two measurements of the coating color-play response to shear. Such a method, however, requires considerably more effort in the calibration process. Rather than generating a single calibration curve of color versus shear magnitude at $\beta = 0°$, the entire family of color versus $\beta$ curves for many parametric values of shear magnitude must be obtained, as shown in the plot of FIG. 7.

Two fixed/synchronized cameras (not shown) would be deployed at $\alpha_c$, $\phi_{c1}$, and $\alpha_c$, $\phi_{c2}$ such that the two lines-of-sight encompassed the vector directions to be measured. The in-plane angular spacing $\Delta\phi_c$ between the two cameras would thus be known.

Converting the two color measurements ($\lambda_{D1}$ and $\lambda_{D2}$) into a vector magnitude would then involve interpolation within the family of curves depicted by FIG. 7. The measured vector magnitude would be defined when the two measured colors were found to lie on the same shear-magnitude curve subject to the condition $|\beta_1| + |\beta_2| = \Delta\phi_c$, where $|\beta_2| < |\beta_1|$ when $\lambda_{D2} < \lambda_{D1}$ or $|\beta_1| < |\beta_2|$ when $\lambda_{D1} < \lambda_{D2}$.

By experimental arrangement, one value of $\beta$ would be positive and one would be negative. Having interpolated within the family of calibration curves to define the correct shear magnitude, the two values of $\beta$ could then be read directly from the two $\lambda_D$ intercepts with this "correct-magnitude" curve. The measured vector orientation would then be determined from geometry using either pair of angles, $\phi_{C1}$ and $\beta_1$ or $\phi_{C2}$ and $\beta_2$.

It will be understood by those skilled in the art that although the invention has been described relative to exemplary preferred embodiments thereof, variations and modifications can be effected in these embodiments without departing from the scope and spirit of the invention.

What is claimed is:

1. A method for determining surface shear stress direction and magnitude at every point on a surface, said method comprising the following steps:
   providing a liquid crystal coating on a surface;
   directing a beam of white light perpendicular to said surface onto said surface;
   positioning a color-measuring camera at an oblique-view angle above said surface;
   generating, in a calibration step, a calibration curve of color versus absolute shear magnitude for calibration shear vectors aligned with and directed away from said camera;
   rotating said camera from the setting used for said calibration step;
   obtaining a plurality of images by said camera along a circumferential arc;
   determining said shear direction from said plurality of images; and
   determining, from the color corresponding to said shear directions, said shear magnitudes from said calibration curve.

2. A method as claimed in claim 1, wherein said calibration step comprises applying a maximum shear level to said surface.

3. A method as claimed in claim 1, wherein said calibration step comprises rotating said camera about said surface, said oblique view angle remaining fixed, until a maximum color change signal is located.

4. A method as claimed in claim 3, wherein said calibration step further comprises adjusting the above-plane view angle until a further maximum color change signal is located, the resulting above-plane view angle to be maintained constant for both calibration and data acquisition.

5. A method as claimed in claim 1 wherein said calibration step comprises using point-measurement techniques to measure absolute shear stress magnitudes.

6. A method as claimed in claim 1, wherein said plurality of images for data acquisition includes three or more images.

7. A method as claimed in claim 1, wherein the step of determining shear direction at each physical point on the surface comprises plotting color versus circumferential view angle, curve fitting a symmetric function along said plot, and determining, from the minimum of said symmetric function, said shear direction and corresponding color.

8. A method as claimed in claim 7, wherein said plurality of images are full-surface images and further comprising plotting color versus circumferential view angle for identical surface points taken from each of said full-surface images.

9. A method as claimed in claim 7, wherein said corresponding color at said minimum of said symmetric function can be used in conjunction with said calibration curve to determine the shear magnitude at each physical point recorded in each of said full-surface images.

* * * * *